United States Patent [19]

Steele

[11] 4,313,699

[45] Feb. 2, 1982

[54] QUICK MOUNT HIGH PRESSURE BOOSTER VALVES

[75] Inventor: James R. Steele, Stillwater, Minn.

[73] Assignee: Dynamic Air Inc., St. Paul, Minn.

[21] Appl. No.: 117,379

[22] Filed: Jan. 31, 1980

[51] Int. Cl.³ .................................................. B65G 53/58
[52] U.S. Cl. ...................................... 406/93; 137/614.2; 137/853; 251/146
[58] Field of Search .................. 406/93, 94, 95, 14; 137/853, 614.2, 312; 251/146

[56] References Cited

U.S. PATENT DOCUMENTS

| | | | |
|---|---|---|---|
| 2,881,010 | 4/1959 | Bouma | 251/146 X |
| 3,708,207 | 1/1973 | Steele | 406/93 |
| 4,067,622 | 1/1978 | Krambrock et al. | 406/94 X |
| 4,171,007 | 10/1979 | Bouteille | 137/853 X |

Primary Examiner—Jeffrey V. Nase
Attorney, Agent, or Firm—Jacobson and Johnson

[57] ABSTRACT

An adjustable pneumatic conveyor tube booster valve for banding to the top of a conveyor tube with the booster valve inlet located remotely from the pneumatic conveyor tube. The booster valve is constructed from an annular rubber sleeve which flexes inwardly in response to high inlet pressure in the booster valve to permit flow of air into the conveyor tube but returns to its original shape when the pressure in the inlet drops to prevent back flow of material from the conveyor tube into the booster valve. An adjustable cap permits adjustment of gas flow into the booster tube.

7 Claims, 4 Drawing Figures

QUICK MOUNT HIGH PRESSURE BOOSTER VALVES

BACKGROUND OF THE INVENTION

1. Field of the Invention.

This invention relates generally to booster valves and, more specifically, to booster valves which can be quickly and easily attached to existing conveyor lines.

2. Description of the Prior Art

Pneumatic conveyors are often employed for a wide variety of applications including the transfer of dry granular material such as sand, salt, flour and cement. Two types of systems are in general use for the transfer of granular materials. The first type depends upon a high velocity air stream to carry a relatively small amount of material at high speeds. Serious disadvantages accompany this method. The high speed of the particles tend to abrade the interior surfaces of the conveyor tubes. Hence, continual maintenance is a necessity and frequent operational shutdowns are required to repair and replace parts. In addition, the high velocity impacts which are unavoidable in this type of system destroy the transported material or reduce it to an undesirably low grain size.

A preferred type of pneumatic conveyor which avoids the above problems is the slow speed variety in which the conveyor tube is practically full of material and the material is moved by air pressure applied to it at its source and at a number of successive locations along the conveyor tube. Although the speed of the material is less, the density is so much higher that the net volume moved per unit time is much higher. Furthermore, wear is reduced both on the conveyor tube and on the material.

The present invention pertains to the booster valves which can be easily and quickly positioned along the conveyor tube. The boosters are controlled by a pilot valve which controls the pressure as required to keep the material moving. Some prior art booster valves are extremely difficult to adjust. If too much pressure is applied, the material in the conveyor tube is blocked. On the other hand, if the pressure is too low, the material is not properly transported. Since the proper applied pressure depends on the pressure inside the tube and since the pressure in the tube varies with the material density, flow rate, consistency, and the pressure applied by adjacent booster valves, it is readily apparent how difficult it is to achieve the correct pressure. Continual adjustments are necessary to maintain the careful balance of the system. One method of simplifying this type of pneumatic conveyor system is to employ one-way valves in the booster stations which operate to release pressurized gas into the tube when the pressure in the tube drops below a predetermined value.

Typical of the prior art patents on such devices are the following patents:

The Bauregger U.S. Pat. No. 2,946,628 shows a sand booster valve having spaced openings located along the periphery of the conveyor tube. Air under pressure is introduced into the conveying line through the spaced openings.

The Horn U.S. Pat. No. 1,733,302 shows a series of nozzles located around a pipe that has movable walls that permit introducing cleaning air into the main pipe through the movable wall.

The Tuma U.S. Pat. No. 3,499,461 shows a device for coupling pipes together having a chamber for flushing material from the pipes.

The Wiltse U.S. Pat. No. 2,897,005 shows a system in which two fluidized conduits are located parallel to one another with one conduit supplying pressure to the other through a ball check valve. The Wiltse device has a plenum chamber located around the conveyor tube to thereby direct fluid radially inward from a number of ports that are spaced around the outside of the conveyor tube.

My prior art U.S. Pat. No. 3,708,207 shows a pneumatic conveyor booster valve having an annular tapered seal which flexes inward to permit flow of air to the conveyor tube.

The Flain U.S. Pat. No. 3,604,758 shows a device which uses a porous line to permit passage of air into the conveying tube.

The Gunderson U.S. Pat. No. 3,876,259 shows a pneumatic conveying tube having a diverging and converging section with an air inlet section located intermediate thereto for boosting the pressure.

Most of the prior art valves show permanently mounted units having a mechanism for introducing the air which are located adjacent or near the pressurized line. Also, it is often desired to be able to quickly replace a booster valve if the valve should become faulty. In certain applications it is also desired to have a controllable, adjustable air pressure supply with no back flow and which is remotely located from the material being transported and which can be readily cleaned and is relatively free of clogging. The present invention achieves such objective.

SUMMARY OF THE INVENTION

Briefly, the present invention includes a strap attached booster valve that can quickly be attached to a conveyor tube and which does not clog and which injects air into the conveyor tube at one or more points along the top of the conveyor tube. An annular tapered rubber sleeve is positioned within the booster valve which is remotely spaced from the conveyor tube. A positionable cap encloses the section of tube containing the rubber sleeve so that one can control the amount of air introduced into the conveyor tube. A pilot valve provides control of the air flow into the booster valve inlet.

DESCRIPTION OF THE PREFERRED EMBODIMENT

Figure 1:
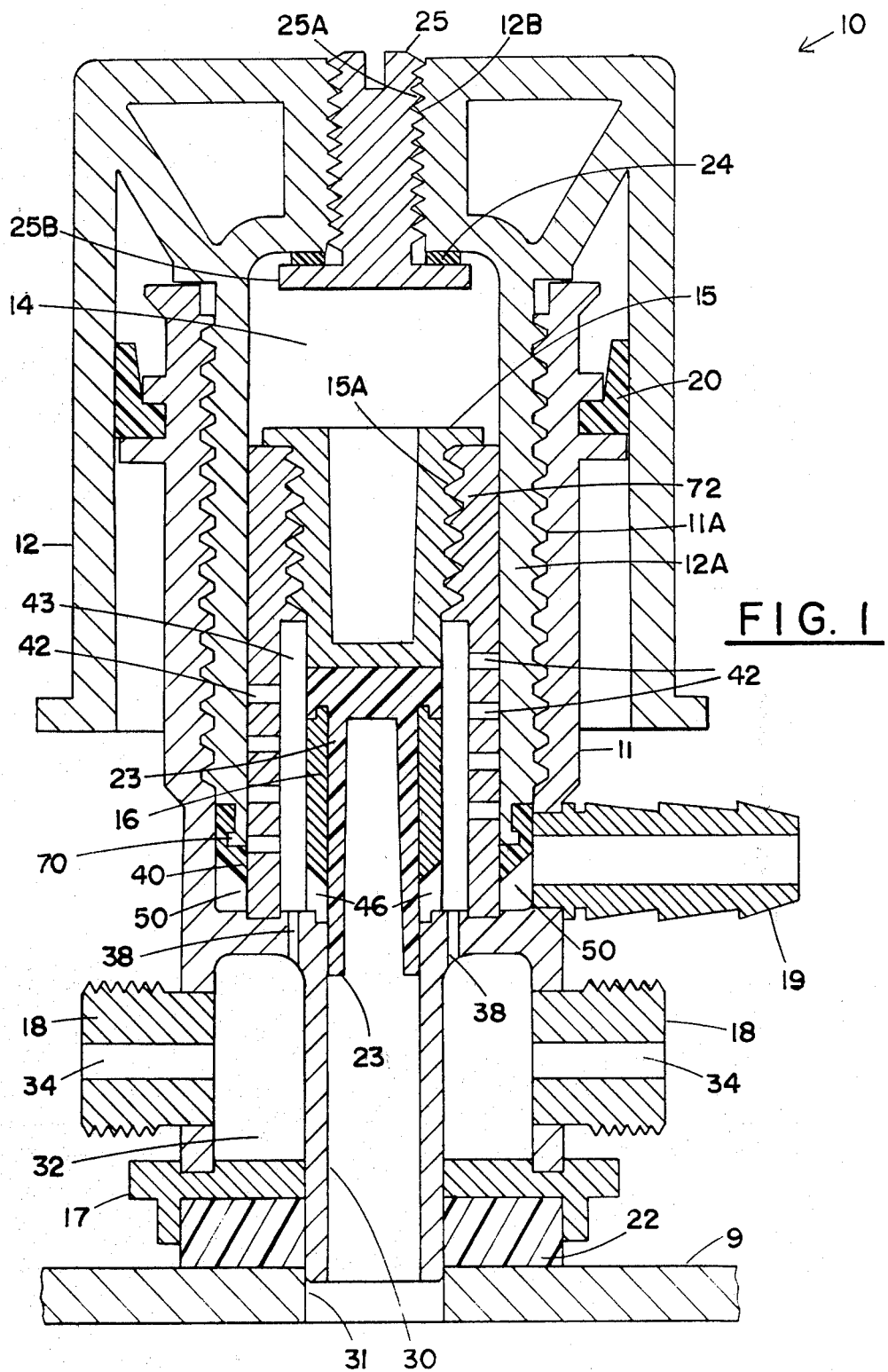
FIG. 1 is a cross sectional view of a booster valve in the closed position.
Figure 4:
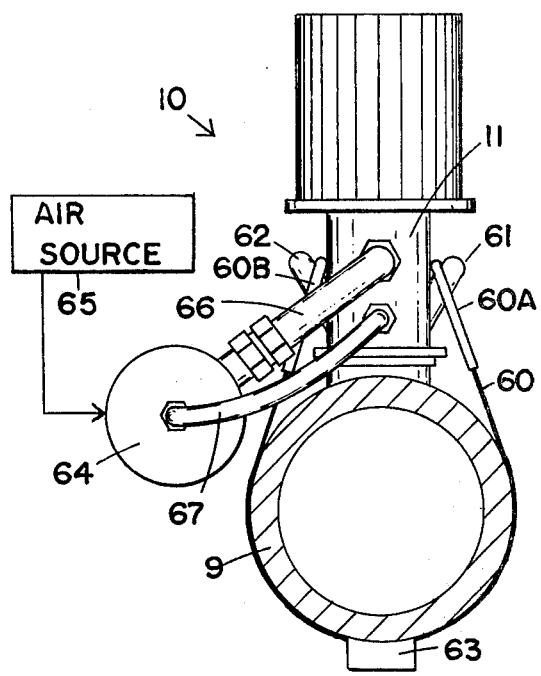
FIG. 4 shows my booster valve mounted to a conveyor tube.

Referring to FIG. 1 and FIG. 4, reference numeral 10 generally designates the booster valve of the present invention. Booster valve 10 comprises a main body 11 which attaches to a top portion of a conveyor tube side wall 9 through a strap 60.

FIG. 4 shows how booster valve 10 is fastened to conveyor tube 9. A strap 60 having a loop 60A on one end and a loop 60B on the opposite end loop respectively around ears 61 and 62 that project from valve 10. Located at the bottom of conveyor tube 9 is a tightening device 63 that permits one to secure booster valve 10 against conveyor tube 9.

Attached to booster valve main body 11 is an annular seal 20 which forms an air-tight seal between the outside of main body 11 and the inside of cap 12.

Main body 11 has a set of threads 11A which engage threads 12A on cap 12. The threads coact to permit raising or lowering cap 12 with respect to main body 11. Located centrally within cap 12 is an inner chamber 14 which is sealed to the outside atmosphere through a pressure release screw 25. Pressure release screw 25 contains a threaded section 25A that mounts into a threaded opening 12B in cap 12 and includes a ring seal 24 located between the inside of cap 12 and head 25B of pressure release screw 25. The purpose of seal 24 is to prevent air from escaping from between threads 12B and threads 25A during operation of booster valve 10.

Loosening screw 25 permits one to bleed pressurized air from chamber 14, i.e., the air flows past seal 24 and around threaded pressure relief screw 25. Typically, to quickly bleed the pressure chamber 14 the threads 12B and 25A are loosely fitting or a slot is located along the threads to permit one to rapidly bleed chamber 14. Pressure build up in chamber 14 occurs from air leakage around the threads 15A on inner chamber plug 15. Inner chamber plug 15 is a removable plug which allows one to replace valve seal 23 when needed.

Figure 2:
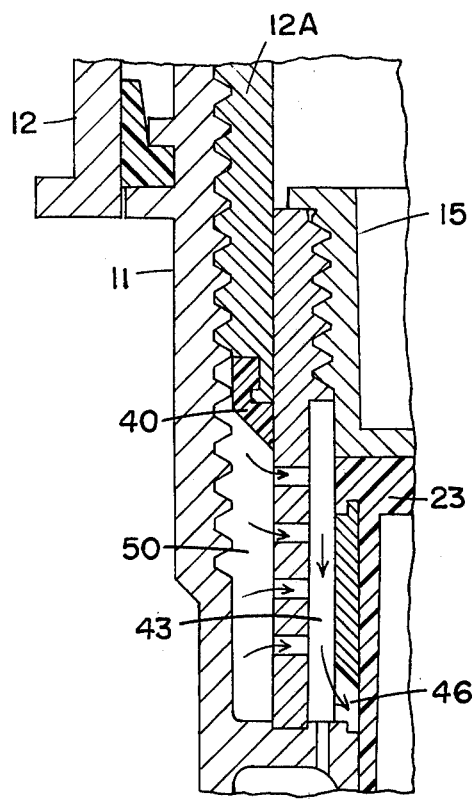
FIG. 2 is a portion of a cross sectional view of the booster valve in the open position.

To obtain a flow condition in valve 10 it is necessary for an operator to rotate cap 12 about main body 11 thus raising section 12A and a ring seal 40 with respect to main body 11. FIG. 1 shows booster valve 10 in the closed position while FIG. 2 shows the booster valve in the open position. The opening and closing is accomplished by an annular seal 40 which is mechanically locked to cap 12 through a cylindrical lip 70 that extends around the periphery of member 12A. Thus, annular seal 40 is operable for sliding upward and downward along the outside of a cylindrical member 72 in response to rotation of cap 12. As seal 40 is raised it rotates upward past openings 42 in cylindrical member 72 to the open position shown in FIG. 2. In the open position there is provided a path for air flow from an outer annular cylindrical plenum chamber 50 into an inner annular cylindrical plenum chamber 43 which is centrally located inside of cylindrical member 72. Concentrically located inside of annular cylindrical plenum chamber 43 is an annular cylindrical valve retainer 16 having lower air passage slots 46. Located on the inside of valve retainer 16 is an annular cylindrical flexible valve seal 23. Valve seal 23 is made from a flexible yet resilient material which flexes radially inwardly in response to a pressure differential across seal 23. The inward flexing allows air to flow through slots 46 and past seal 23. Although only two slots are shown, more slots can be used so that the flow area of slots is at least as great as the flow area defined by holes 42.

Typically, valve seal 23 is made from materials such as rubber of the like. The flexibility permits air to flow from chamber 43 into tube 30 through slots 46 while the resilience permits valve seal 23 to close off slots 46 to prevent back flow from tube 30 into chamber 43. Such a condition could occur if the conveyor line pressure should exceed the inlet pressure.

Thus, in response to higher pressure in inlet 19 then in conveyor 9, air flows into conveyor tube 9. The air is used to assist materials through the conveyor tube. Conversely, if the air pressure in conveyor tube 9 is higher, the natural resiliency of valve seal 23 causes the sides of valve seal 23 to seal slots 46 and thus prevent any materials in the conveyor tube 9 from entering booster valve 10.

To monitor the pressure in chamber 43 there is provided a pair of pilot valve attachment members 18 that connect to chamber 43 through an annular plenum chamber 32 and passages 38.

Located beneath annular plenum chamber 32 is a base 17 and a seal 22 that prevents leakage between booster valve 10 and the outside of conveyor 9. Base 17 and seal 22 have an arcuate shape that conforms to the outside surface of the conveying tube.

FIG. 4 shows a fluid supply line 66 connected to booster valve 10 and an air source 65 supplies fluid to booster valve 10 through pilot valve 64 and air line 66.

To control the air flow into valve 10 there can be provided a pressure responsive pilot valve 64 which monitors the pressure in chamber 32 through pressure line 67. If the pressure is below a predetermined value pilot valve 64 can be made responsive to supply air at higher pressure to booster valve 10 through inlet 19.

In summary, in operation of my system high pressure air introduced at hose connector inlet 19 flows through valve 10 and pushes annular seal 23 inward thereby permitting air to flow into conveyor 9 into opening 31 and through pipe 30. Thus, air entering conveyor tube 9 is useable to assist in forcing material to flow through conveyor tube 9.

FIG. 1 illustrates that booster valve 10 can be quickly mounted to an existing conveyor line by merely drilling a hole in a conveyor line and inserting member 30 into the opening. The base 17 and seal 22 coact to form a seal between booster valve 10 and conveyor tube 9. Tightening strap 60 (FIG. 4) forces booster valve 10 tightly against conveyor tube 9.

Another feature of the present invention is that by installation of the openings in the top portion of a conveyor tube gravity aids in preventing any conveyed materials from plugging the inlet, i.e., any materials that may enter tube 30 usually fall back into the conveyor tube without clogging tube 30.

A further feature of the invention is that valve 10 can be adjusted for the volume of air flow entering the system by raising or lowering cap 12 thereby increasing or decreasing the flow area.

Figure 3:
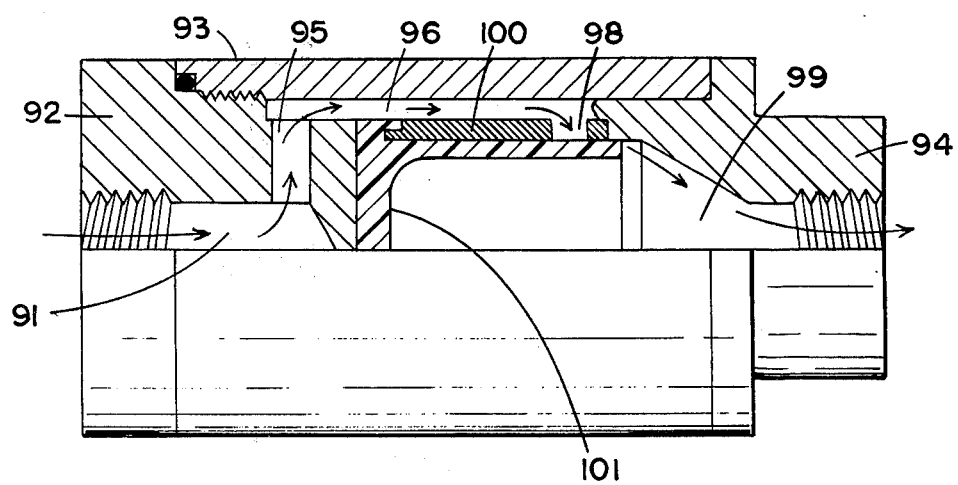
FIG. 3 is a partial sectional view of an alternate embodiment.

Referring to FIG. 3, reference numeral 90 designates an alternate embodiment of a nonadjustable booster valve. Booster valve 90 comprises an inlet member 92 having an air inlet 91 therein, an annular casing member 93 and an outlet member 94 which define the remaining portions of valve 90. Located centrally within booster valve 90 is a seal retainer tube 100 and a flexible yet resilient seal 101 which is identical to seal 23. The outer surface of seal retainer tube 100 coacts with member 93 to define an annular plenum chamber 96 while the inside of seal retainer tube centrally supports seal 101 in valve 90. Located in one end of seal retainer tube is an opening 98 that extends partially around cylindrical tube 100. Typically, such openings are spaced around the periphery of cylindrical tube 100 to permit air to flow past flexible seal 101.

In operation of valve 90 air enters inlet 91, flows through passage 95 into annular plenum chamber 96. If the pressure in annular chamber 96 is greater than the pressure in chamber 99, the air forces seal 101 to flex radially inward to permit air to flow through opening 98 into chamber 99.

If the pressure in chamber 99 is higher than the pressure in chamber 96, the resiliency of seal 101 seals passage 98 to prevent back flow into chamber 100.

I claim:

1. A booster valve for assisting the flow of material in a conveyor tube with fluid under pressure comprising:

a housing member having an inlet for attachment to a fluid source and an outlet for discharging a fluid into a conveyor tube, said outlet having means for engagement of the exterior of a conveyor tube to thereby discharge fluid into a conveyor tube at a specified location on a conveyor tube;

a cylindrical resilient seal located in said housing member, said cylindrical resilient seal having an exterior, an interior surface and a seal retaining guide located on one of said surfaces, said seal responsive to a pressure differential across said seal so that a higher pressure on said inlet than said outlet permits flexing of said seal to permit flow of fluid past said seal through said outlet and into a conveyor tube to thereby assist the flow of materials through a conveyor tube and where a higher pressure in said outlet than in said inlet permits the resiliency of said seal to return to its original shape to prevent back flow of material from said outlet to said inlet;

means for relieving the pressure in said booster valve and a removable member to permit replacement of said seal; and means located on said booster valve to permit quick mounting of said booster valve to a conveyor tube.

2. The invention of claim 1 wherein said means located on said booster valve includes a band for fastening said booster valve to a conveyor tube.

3. The invention of claim 2 wherein said booster valve includes a pressure cap for adjusting the flow of fluid through said booster valve.

4. The invention of claim 1 when said seal comprises a rubber seal.

5. The invention of claim 4 wherein said retainer guide located on the exterior of said seal prevents flexing of said seal in a radially outward direction from said retainer guide.

6. The invention of claim 5 wherein said retainer guide has openings therein to permit flow of fluid therethrough.

7. The invention of claim 6 wherein said booster valve is located on the top of a conveyor tube to thereby permit any material that may enter said outlet to fall into a conveyor under the influence of gravity.

* * * * *